Patented Jan. 12, 1943

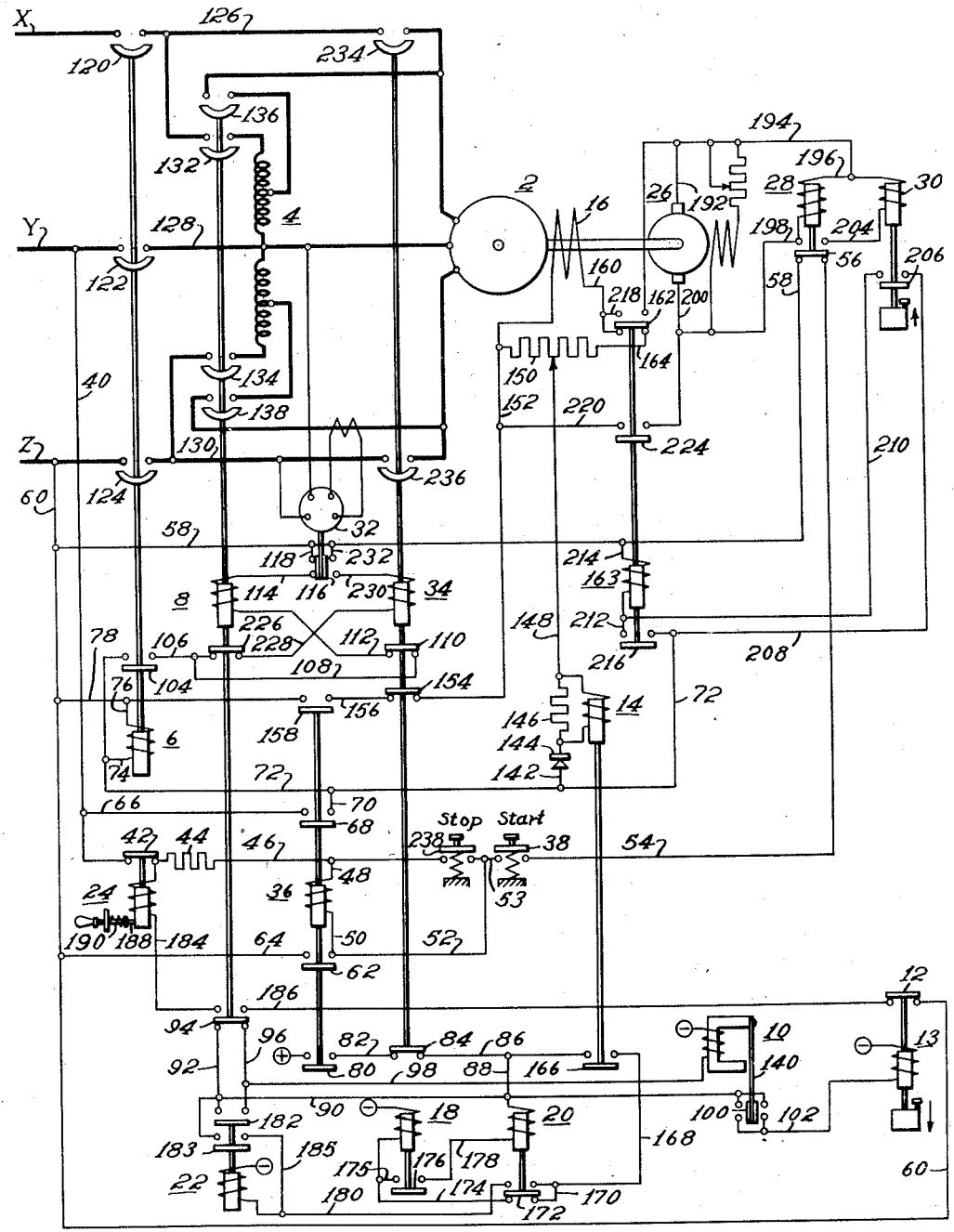

2,308,304

UNITED STATES PATENT OFFICE 2,308,304

ROTOR PROTECTIVE SYSTEM

Maurice E. Reagan, Pittsburgh, Pa., assignor to Westinghouse Electric & Manufacturing Company, East Pittsburgh, Pa., a corporation of Pennsylvania Application September 26, 1941, Serial No. 412,381

5 Claims. (Cl. 172—289)

My invention relates, generally, to protective systems for synchronous machines and, more particularly, to a system for preventing the continued energization of a synchronous machine in the event that it fails to start or fails to rotate in the proper manner when energized.

It is common practice to start large synchronous machines such, for example, as synchronous condensers, frequency changers, and the like, by applying reduced starting potential thereto until they have reached substantially synchronous speed and then to apply full running potential. It may happen, however, that the rotor may fail to rotate for one reason or another and in such an event the sustained starting current would soon damage the machine if the machine continued to be energized by the starting potential.

It is an object of my invention, therefore, to provide a protective system for use with machines of this type which shall function to deenergize the machine in the event that the rotor fails to rotate a predetermined amount in a predetermined time after starting power is applied to the machine.

A further object of the invention is to provide a protective system for a synchronous machine which shall function to start the machine at reduced potential, apply field excitation when the desired speed is reached, apply full potential to the machine when the desired speed and power factor conditions are reached, and to deenergize the machine in the event that it fails to rotate a predetermined amount in a predetermined time after starting power is applied thereto.

These and other objects and advantages of the invention will be apparent from the following detailed description taken in connection with the accompanying drawing, the single figure of which is a diagrammatic view of a starting system for a synchronous machine embodying the principal features of my invention.

In practicing the invention in one form thereof, a synchronous machine 2 may be connected to a source of alternating current power indicated by conductors X, Y and Z through an autotransformer 4 and circuit breakers 6 and 8, which may be referred to as main and starting breakers, respectively. When the starting breaker 8 is closed a pendulum relay 10 is deenergized to maintain the contact element 12 of a time delay relay 13 in open circuit position for a predetermined time. A relay 14 is also connected to be energized by the potentials of the source of power and the potential induced in the field winding 16 of the machine 2. As the machine 2 starts to rotate the relay 14 will be energized each time the potentials acting on it come into the same phase relation and deenergized when the potentials go out of coinciding phase relation.

This alternate energization and deenergization of the relay 14 will cause it to operate a counting chain of relays comprising relays 18, 20 and 22 which, if they are all energized before the timing relay 13 closes its back contact 12, will again energize the relays 10 and 13 and prevent a relay 24 from operating to open the main breaker 6. If the relays 18, 20 and 22 are not energized by the energization, deenergization, and subsequent reenergization of the relay 14 before the contact element 12 of the relay 13 closes, the relay 24 will cause the main breaker 6 to open to thereby deenergize the machine 2.

When the output potential of the exciter 26 for the machine 2 has reached the full value that it is desired to apply to the field winding 16, relays 28 and 30 will operate to apply excitation potential to the machine 2. When the excitation of the machine 2 has built up to the value to produce the desired power factor, a watt relay 32 will open the starting breaker 8 and close a running breaker 34 to connect the machine 2 directly to the power source and thus apply full voltage thereto.

Considering the invention more in detail, a starting relay 36 is connected to be energized upon the actuation of a manual control switch 38 in a circuit which extends from the conductor Y through the conductor 40, a contact element 42 of the relay 24, a current limiting resistor 44, conductors 46 and 48, the winding of the relay 36, conductors 50, 52 and 53, the contact element 38, a conductor 54, a contact element 56 of the relay 28 in back contact position and conductors 58 and 60 to the conductor Z. When the relay 36 is energized, it closes its own holding circuit through its contact element 62, the holding circuit extending from the conductor Y to the conductor 40, the contact element 42, the resistor 44, the conductors 46 and 48, the winding of the relay 36, the conductor 50, the contact element 62, a conductor 64 and the conductor 60 to the conductor Z.

The actuation of the relay 36 will also close an energizing circuit for the main breaker 6 which extends from the conductor Y through the conductor 40, a conductor 66, a contact element 68 of the relay 36, conductors 70, 72 and 74, the closing winding of the breaker 6 and conductors 76, 78 and 60 to the conductor Z.

The actuation of the relay 36 will also close an energizing circuit for the pendulum relay 10 extending from positive potential indicated by the plus sign through a contact element 80 of the relay 36, a conductor 82, an auxiliary contact element 84 of the circuit breaker 34, conductors 86, 88, 90 and 92, an auxiliary contact element 94 of the starting breaker 8 in back contact position, conductors 96 and 98, and the winding of the pendulum relay 10 to negative potential.

The actuation of the pendulum relay 10 will close an energizing circuit for the timing relay 13 which extends from positive potential through the contact element 80, the conductor 82, the contact element 84, the conductors 86, 88 and 90, a contact element 100 of the pendulum relay 10 in actuated position, a conductor 102 and the winding of the relay 13 to negative potential.

The closure of the main breaker 6 will cause its auxiliary contact element 104 to close an energizing circuit for the circuit breaker 8 which extends from the conductor Y through the conductors 40 and 66, the contact element 68, the conductors 70 and 72, the auxiliary contact element 104, conductors 106 and 108, an auxiliary contact element 110 of the running breaker 34, a conductor 112, the closing winding of the breaker 8, a conductor 114, a contact element 116 of the watt-relay 32 and conductors 118, 58 and 60 to the conductor Z.

The actuation of the main breaker 6 will cause its contact elements 120, 122 and 124 to connect the power conductors X, Y and Z to conductors 126, 128 and 130, respectively. The actuation of the starting breaker 8 will cause its contact elements 132 and 134 to connect the energized conductors 126 and 130 to energize the auto-transformer 4 and its contact elements 136 and 138 to connect the auto-transformer in energizing relation with the synchronous machine 2.

The actuation of the starting breaker 8 will cause its contact element 94 to break the energizing circuit for the pendulum relay 10 and the armature 140 of the pendulum relay 110 will vibrate to cause its contact element 100 to alternately engage and disengage its associated contact elements to repeatedly energize the timing relay 13 and thus keep its contact element 12 in open circuit position so long as the armature 140 of the pendulum relay 10 continues to vibrate.

The actuation of the relay 36 will also complete a circuit extending from the conductor Y through the conductors 40 and 66, the contact element 68, the conductors 70 and 72, a conductor 142, a rectifier element 144, the winding of the stepping relay 14 in parallel circuit relation with a resistor 146, a conductor 148, a selected portion of a resistor 150, a conductor 152, an auxiliary contact element 154 of the circuit breaker 34, a conductor 156, a contact element 158 of the relay 36 and conductors 78 and 60 to the conductor Z. The resistor 150 is connected in circuit with the field winding 16 of the synchronous machine 2 in a circuit which extends from one terminal of the field winding 16 through a conductor 160, a contact element 162 of a relay 163 in back contact position, a conductor 164, the resistor 150 and the conductor 152 to the other terminal of the field winding 16. The resistor 150 will thus be energized in accordance with the potential induced in the field winding 16 of the synchronous machine 2 and the relay 14 will be energized in accordance with the potential induced in the field winding 16 and the potential from the source taken from the conductors Y and Z. The relay 14 will, therefore, be intermittently energized and deenergized in accordance with the phase relations between the potentials of the source from the conductors Y and Z and the potential induced in the field winding 16 which phase relations will vary in accordance with the speed of rotation of the synchronous machine 2 when starting potential is applied to it.

On the first actuation of the relay 14, its contact element 166 will close an energizing circuit for the counting relay 18 which extends from positive potential to the contact element 80, the conductor 82, the contact element 84, the conductor 86, the contact element 166, conductors 168 and 170, a contact element 172 of the relay 20 in back contact position, conductor 174 and the winding of the relay 18 to negative potential. The actuation of the counting relay 18 will close an energizing circuit for the counting relay 20 but this energizing circuit will be shunted by the contact element 166 in a circuit which extends from one terminal of the relay 20 through the conductors 88 and 86, the contact element 166, conductors 168 and 170, the contact element 172 of the relay 20, the conductors 174 and 175, a contact element 176 of the counting relay 18 and a conductor 178 to the other terminal of the counting relay 20. When the stepping relay 14 is next released, its contact element 166 will move to open circuit position to break the shunting circuit of the counting relay 20 and thereby permit the counting relay 20 to be energized in series circuit relation with the counting relay 18 in a circuit which extends from positive potential through the contact element 80 of the relay 36, the conductor 82, the auxiliary contact element 84 of the running breaker 34, conductors 86 and 88, the winding of the relay 20, the conductor 178, the contact element 176 of the counting relay 18, conductors 175 and 174 and the winding of the counting relay 18 to negative potential.

When the stepping relay 14 is next actuated, its contact element 166 will close a circuit for the counting relay 22 which extends from positive potential through the contact element 80, conductor 82, contact element 84, the conductors 86, the contact element 166, the conductor 168, the contact element 172 of the counting relay 20 in front contact position, a conductor 180 and the winding of the counting relay 22 to negative potential. When the counting relay 22 is energized, its contact element 182 will close an energizing circuit for the pendulum relay 10 which extends from positive potential through the contact element 80, the conductor 82, the contact element 84, the conductors 86, 88, 90 and 92, the contact element 182, the conductors 96 and 98 and the winding of the pendulum relay 10 to negative potential. The actuation of the counting relay 22 will cause it to close its contact element 183 in its own holding circuit which extends from positive potential through the contact element 80, the conductor 82, the contact element 84, the conductors 86, 88 and 90, the contact element 183, conductors 185 and 186, and the winding of the relay 22 to negative potential. The timing relay will thus remain energized and will maintain the energizing circuit for the pendulum relay 10 and the timing relay 13.

In the event that the timing relay 22 is not energized to again reenergize the pendulum relay 10 before the timing period of the pendulum relay 10 and the timing relay 13 has elapsed to permit the contact element 12 to move to circuit closing position, the contact element 12 will complete an energizing circuit for the relay 24 which extends from the conductor Y through the conductor 40, the contact element 42 of the relay 24, the winding of the relay 24, a conductor 184, the auxiliary contact element 84 of the starting breaker 8 in front contact position, a conductor 186, the contact element 12 and the conductor 60 to the conductor Z. The actuation of the relay 24 will permit a manually resettable detent 188 to be moved by a spring 190 to a position to lock out the relay 24 and thus prevent its contact element 42 from moving to closed circuit position until the relay is manually reset by removal of the detent 188 from the path of travel of the relay armature.

The exciter 26 will build up voltage as it is rotated by the synchronous machine 2 and when its voltage has reached the voltage which it is desired to apply to the field winding 16 for exciting the synchronous machine 2, it will actuate a potential responsive relay 28 which is connected to respond to the potential of the exciter 26 in a circuit which extends from one terminal of the exciter 26 through conductors 192, 194 and 196, the winding of the potential responsive relay 28 and conductors 198 and 200 to the other terminal of the exciter 26. The actuation of the relay 28 will connect the time delayed relay 30 to be actuated by the potential of the exciter 26 in a circuit which extends from one terminal of the exciter 26 through conductors 192, 194 and 196, the winding of the relay 30, a conductor 204, the contact element 56 of the relay 28 in front contact position and conductors 198 and 200 to the other terminal of the exciter 26. When the timing relay 30 closes its contact element 206, an energizing circuit for the relay 163 will be completed extending from the conductor Y through the conductors 48 and 66, the contact element 68, the conductors 70 and 72, a conductor 208, the contact element 206 of the relay 30, conductors 210 and 212, the windings of the relay 163 and conductors 214, 58 and 60 to the conductor Z. The actuation of the relay 163 will cause its contact element 216 to close a holding circuit for the relay 163 by connecting the conductor 208 with the conductor 212.

The actuation of the relay 163 will disconnect the resistor 150 from the circuit of the field winding 16 by moving the contact element 162 of the relay 163 to front contact position and will connect the field winding 16 to be energized by the exciter 26 in a circuit which extends from one terminal of the exciter 26 through the conductors 192 and 194, the contact element 162 of the relay 163 in contact position, the conductors 218 and 160, the field winding 16, the conductors 152 and 220, a contact element 224 of the relay 163 and the conductor 200 to the other terminal of the exciter 26.

When the excitation of the synchronous machine 2 has increased sufficiently, the power factor thereof will be changed from lag to lead and the watt relay 32 will move its contact element 116 from the left-hand contact position to the right-hand contact position. This actuation of the contact element 116 of the relay 32 will de-energize the closing winding of the starting breaker 8 and cause its contact element 226 to move to closed circuit position to close an energizing circuit for the closing winding of the running breaker 34 which extends from the conductor Y, through conductors 48 and 66, the contact element 68 of the relay 36, the conductors 70 and 72, the auxiliary contact element 104 of the main breaker 6, the conductor 106, the auxiliary contact element 226 of the circuit breaker 8, a conductor 228, the winding of the closing coil of the running breaker 34, a conductor 230, the contact element 116 of the relay 32 in the right-hand contact position and conductors 232, 58 and 60 to the conductor Z. The actuation of the running breaker 34 will cause its contact elements 234 and 236 to connect the synchronous machine 2 to be energized directly from the conductors X, Y and Z and it will then have normal running voltage applied thereto.

When it is desired to stop the synchronous machine 2 for any reason, a manual control stop switch 238 may be actuated to complete a shunting circuit for the winding of the starting relay 36 which extends from one terminal of the winding of the relay 36 through conductors 48 and 46, the stop switch 238 and conductors 53, 22 and 58 to the other terminal of the winding of the starting relay 36. The starting relay 36 will thus be released to open the energizing circuit for the closing coils of the circuit breakers 6 and 34 to remove power from the synchronous machine 2. The current limiting resistor 44 is provided to permit the shorting of the winding of the relay 36 by the stop switch 238 without placing a short circuit between the conductors Y and Z.

In the operation of the system, when it is desired to start the synchronous machine 2, the start switch 38 will be manually actuated to energize the starting relay 36 which will close its own holding circuit and energize the pendulum relay 10 and the closing winding of the main breaker 6. The closure of the main breaker 6 will cause the starting breaker 8 to be closed to apply a starting voltage to the synchronous machine through the auto-transformer 4 and will break the energizing circuit for the pendulum relay 10 to thereby start the timing period of the pendulum relay 10. If the synchronous machine 2 rotates sufficiently within the timing period of the pendulum relay 10 and its associated timing relay 13 to cause the counting chain of relays comprising relays 18, 20 and 22 to reenergize the pendulum relay 10, the contact element 12 of the timing relay 13 will be prevented from moving to closed circuit position. If, however, the synchronous machine 2 fails to rotate or rotates so slowly that the contact element 12 of the timing relay 13 moves to closed circuit position before the relay 22 reenergizes the pendulum relay 10, the contact element 12 will close the energizing circuit for the relay 24 which will remove power from the synchronous machine 2.

As the synchronous machine 2 starts and reaches its synchronous speed, its field energization will be applied by the potential responsive relay 28 and associated time delay relay 30 and when the excitation of the machine 2 has increased to where a leading power factor is produced, the starting breaker 8 will be opened and the running breaker 34 will be closed to apply normal line potential to the synchronous machine.

The time delay between the actuation of the potential responsive relay 28 and the connection of the field winding 16 to the exciter 26 is provided to ensure that the synchronous machine is rotating at synchronous speed before exciting potential is applied to its field winding.

Thus it will be seen that I have provided a protective system for a synchronous machine which shall function to start the machine at reduced potential, apply field excitation when the desired speed is reached, apply full potential to the machine when the desired speed and power factor conditions are reached, and to deenergize the machine in the event that it fails to rotate a predetermined amount in a predetermined time after starting power is applied thereto.

In compliance with the requirements of the patent statutes, I have shown and described herein a preferred embodiment of my invention. It is to be understood, however, that the invention is not limited to the precise construction shown and described, but is capable of modification by one skilled in the art, the embodiment herein shown being merely illustrative of the principle of my invention.

I claim as my invention:

1. In a protective system for a synchronous machine, means for applying starting power to the machine, means or removing starting power from the machine, timing relay means, means responsive to the means for applying starting power to the machine for starting the timing period of said timing relay means, means actuable by said timing relay means at the end of its timing period for actuating said means for removing starting power from the machine, a stepping relay, means responsive to the rotation of the machine for alternately actuating and releasing said stepping relay in accordance with the speed of rotation of the machine, a counting chain of relays, and circuit means responsive to the actuation, release, and subsequent actuation of said stepping relay for causing said counting chain of relays to interrupt the timing period of said timing relay means in the event that said actuation, release, and subsequent actuation of the stepping relay occurs before the end of the timing period of the timing relay means.

2. In a protective system for a synchronous machine, means for applying starting power to the machine, means for removing the starting power from the machine, timing relay means, means responsive to the means for applying starting power to the machine for starting the timing period of said timing relay means, means actuable by said timing relay means at the end of its timing period for actuating said means for removing starting power from the machine, a stepping relay, means connecting the stepping relay to be actuated and released in accordance with the difference between the frequencies of the potential applied to the machine and the potential induced in the field winding of the machine, a counting chain of relays, and circuit means responsive to the actuation, release, and re-actuation of said stepping relay for causing said counting chain of relays to interrupt the timing period of said timing relay means in the event that said actuation, release, and re-actuation of the stepping relay occurs before the end of the timing period of the timing relay means.

3. In a protective system for a synchronous machine, a starting relay, means for momentarily energizing said starting relay, holding circuit means controlled by said starting relay for maintaining energization of the starting relay, means responsive to the actuation of the starting relay for applying starting power to the machine, timing relay means including delayed release relay means, means responsive to the actuation of the starting relay for energizing said timing relay means, means responsive to the means for applying power to the machine for deenergizing the timing relay means, means for removing power from the machine, means actuable by said timing relay means at the end of its timing period for actuating said means for removing starting power from the machine, a stepping relay, means connecting said stepping relay to be actuated and released in accordance with the difference between the frequencies of the potential applied to the machine and the potential induced in the field winding of the machine, a counting chain of relays, and circuit means responsive to the actuation, release and re-actuation of said stepping relay for causing said counting chain of relays to interrupt the timing period of said timing relay means in the event that said actuation, release, and re-actuation of the stepping relay occurs before the end of the timing period of the timing relay means.

4. In a protective system for a synchronous machine, a starting relay, means for momentarily energizing said starting relay, holding circuit means controlled by said starting relay for maintaining energization of the starting relay, means responsive to the actuation of the starting relay for applying starting power to the machine, timing relay means including delayed release relay means, means responsive to the actuation of the starting relay for energizing said timing relay means, means responsive to the means for applying power to the machine for deenergizing the timing relay means, means responsive to the release of the starting relay means for removing power from the machine, means actuable by said timing relay means at the end of its timing period for breaking the holding circuit for said starting relay, a stepping relay, means responsive to the rotation of the machine for alternately actuating and reclosing said stepping relay in accordance with the speed of rotation of the machine, a counting relay chain, and circuit means responsive to the actuation, release, and re-actuation of said stepping relay for causing said counting relay chain to interrupt the timing period of said timing relay means by reenergizing said timing relay means in the event that said actuation, release, and re-actuation of the stepping relay occurs before the end of the timing period of the timing relay means.

5. In a protective system for a synchronous machine, a starting relay, means for momentarily energizing said starting relay, holding circuit means controlled by said starting relay, means responsive to the actuation of the starting relay for maintaining energization of the starting relay, a starting circuit breaker for applying starting power to the machine, a running circuit breaker for applying running power to the machine, means responsive to the actuation of the starting relay for energizing said starting circuit breaker and maintaining it energized, timing relay means including delayed release relay means, means responsive to the actuation of the starting relay for energizing said timing relay means, means responsive to the closure of said starting circuit breaker for deenergizing the timing relay means, means responsive to the release of the starting relay means for operating said starting circuit breaker, means actuable by said timing relay means at the end of its timing period for breaking the holding circuit for said starting relay, a stepping relay, means responsive to the rotation of the machine for alternately actuating and releasing said stepping relay in accordance with the speed of rotation of the machine, a counting relay chain, circuit means responsive to the actuation, release and re-actuation of said stepping relay for causing said counting relay chain to interrupt the timing period of said timing relay means by reenergizing said timing relay means in the event that the actuation, release, and re-actuation of the stepping relay occurs before the end of the timing period of the timing relay means, and means responsive to predetermined power factor conditions of the machine for opening the starting circuit breaker and closing the running circuit breaker.

MAURICE E. REAGAN.